(12) United States Patent
Ko et al.

(10) Patent No.: US 7,177,250 B2
(45) Date of Patent: *Feb. 13, 2007

(54) APPARATUS FOR ASSIGNING SPARE AREAS FOR DEFECT MANAGEMENT AND APPARATUS FOR HANDLING FRAGMENTED ECC BLOCKS

(75) Inventors: Jung-wan Ko, Yongin (KR); In-sik Park, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/266,185

(22) Filed: Nov. 4, 2005

(65) Prior Publication Data

US 2006/0062114 A1   Mar. 23, 2006

Related U.S. Application Data (60) Continuation of application No. 11/060,356, filed on Feb. 18, 2005, which is a continuation of application No. 10/334,008, filed on Dec. 31, 2002, now Pat. No. 6,879,553, which is a division of application No. 09/609,821, filed on Jul. 3, 2000, now Pat. No. 6,697,307, which is a continuation-in-part of application No. 09/415,916, filed on Oct. 12, 1999, now Pat. No. 6,747,929.

(30) Foreign Application Priority Data

| Oct. 10, 1998 | (KR) | 98-42433 |
| Oct. 21, 1998 | (KR) | 98-44202 |
| Nov. 6, 1998 | (KR) | 98-47538 |
| May 14, 1999 | (KR) | 1999-17357 |

(51) Int. Cl.
   *G11B 5/09* (2006.01)

(52) U.S. Cl. .................... 369/47.14; 369/53.2
(58) Field of Classification Search ............ None
   See application file for complete search history.

(56) References Cited

U.S. PATENT DOCUMENTS

| 5,111,444 A | 5/1992 | Fukushima et al. |
| 5,271,018 A | 12/1993 | Chan |
| 5,548,572 A | 8/1996 | Kulakowski et al. |
| 5,715,221 A | 2/1998 | Ito et al. |
| 5,805,547 A | 9/1998 | Yamamuro |
| 5,805,564 A | 9/1998 | Kobayashi et al. |
| 5,914,928 A | 6/1999 | Takahashi |
| 6,134,214 A | 10/2000 | Takagi et al. |
| 6,370,325 B2 | 4/2002 | Nakatani et al. |
| 6,556,522 B1 | 4/2003 | Ko et al. |
| 6,560,177 B2 | 5/2003 | Ko et al. |
| 6,587,413 B2 | 7/2003 | Ko et al. |
| 6,594,208 B1 | 7/2003 | Ko et al. |
| 6,697,307 B1 | 2/2004 | Ko et al. |
| 6,747,929 B1 | 6/2004 | Ko et al. |
| 6,879,553 B2 | 4/2005 | Ko et al. |

FOREIGN PATENT DOCUMENTS

| CN | 1312558 A | 9/2001 |
| CN | 1312559 A | 9/2001 |
| EP | 0 798 711 | 1/1977 |
| EP | 0 350 920 | 1/1990 |
| EP | 0 866 456 | 9/1998 |
| EP | 1 014 365 | 6/2000 |
| EP | 1 017 055 | 7/2000 |
| JP | 1-224979 | 9/1989 |
| JP | 6-251506 | 9/1994 |
| JP | 6-338139 | 12/1994 |
| JP | 8-329612 | 12/1996 |
| JP | 9-251721 | 9/1997 |
| TW | 392151 | 6/1989 |
| WO | WO 96/27882 | 9/1996 |
| WO | WO 00/31737 | 6/2000 |

OTHER PUBLICATIONS

Foreign Office Action for Chinese Patent Application 00137546.6.
Foreign Office Action for Chinese Patent Application 00137545.8.
Japanese language Office Action for Japanese Application No. 11-288628.

Japanese Language Japanese Office Action for Japanese Patent Application 2000-319958, dated Jun. 1, 2004 (related to the present application).
Australian Search Report dated May 10, 2004 for related Singapore Patent Divisional Application Nos. 200202933-8.
Australian Written Opinions dated May 10, 2004 for related Singapore Patent Divisional Application Nos. 200202933-8 and 200202931-2.
U.S. Appl. No. 11/065,032, filed Feb. 25, 2005, Jung-Wan Ko et al., Samsung Electronics Co., Ltd.
U.S. Appl. No. 11/065,052, filed Feb. 25, 2005, Jung-Wan Ko et al., Samsung Electronics Co., Ltd.
Foreign Office Action for Chinese Patent Application 00137546.6, no complete dates.
Foreign Office Action for Chinese Patent Application 00137545.8, no complete dates.
Japanese language Office Action for Japanese Application No. 11-288628, no complete dates.
Japanese Language Japanese Office Action for Japanese Patent Application 2000-319958, dated Jun. 1, 2004 (related to the present application), no complete dates.
Australian Search Report dated May 10, 2004 for related Singapore Patent Divisional Application Nos. 200202933-8, no complete dates.
Australian Written Opinions dated May 10, 2004 for related Singapore Patent Divisional Application Nos. 200202933-8 and 200202931-2, no complete dates.

*Primary Examiner*—Paul W. Huber
(74) *Attorney, Agent, or Firm*—Stein, McEwen & Bui, LLP (57) ABSTRACT

A recording medium having a spare area for defect management, and a method and apparatus for allocating and assigning the spare area. A plurality of zones are formed as one group without prescribing the relationship between a zone and a group. Spare areas include a spare area for slipping replacement and a spare area for linear replacement. The spare are for slipping replacement is first allocated, and the spare area for linear replacement is allocated according to the size of an area remaining after the spare area for slipping replacement is used and the purpose for which a disc is used. When the spare area for linear replacement becomes deficient during use of the disc, a supplementary spare area for linear replacement is allocated in sequence from the rearmost of a logical file area, such that the spare area can be more flexibly and effectively allocated.

3 Claims, 7 Drawing Sheets

APPARATUS FOR ASSIGNING SPARE AREAS FOR DEFECT MANAGEMENT AND APPARATUS FOR HANDLING FRAGMENTED ECC BLOCKS

CROSS-REFERENCE TO RELATED APPLICATIONS

This application claims the benefit of Korean Application Nos. 98-42433, filed Oct. 10, 1998; 98-44202, filed Oct. 21, 1998; 98-47538, filed Nov. 6, 1998; and 99-17357, filed May 14, 1999 in the Korean Patent Office, the disclosures of which are incorporated herein by reference. This application is a continuation of U.S. patent application Ser. No. 11/060,356, filed Feb. 18, 2005, currently pending, which is a continuation of U.S. patent application Ser. No. 10/334,008, filed Dec. 31, 2002, which issued as U.S. Pat. No. 6,879,553, the disclosures of which are incorporated by reference, which is a divisional application of U.S. patent application Ser. No. 09/609,821, filed Jul. 3, 2000, which issued as U.S. Pat. No. 6,697,307, which is a continuation-in-part of U.S. Ser. No. 09/415,916, filed Oct. 12, 1999, which issued as U.S. Pat. No. 6,747,929.

BACKGROUND OF THE INVENTION

1. Field of the Invention

The present invention relates to the field of optical recording media, and more particularly, to a disc having spare areas for defect management, and an apparatus for allocating and assigning spare areas and for handling fragmented ECC blocks.

2. Description of the Related Art

In order to manage defects on a general recordable/rewritable disc, slipping replacement for skipping defects without providing logical sector numbers to the defects, is used for defects (primary defects) generated upon initialization of the disc, and linear replacement for replacing error correction code (ECC) blocks of an erroneous zone with normal blocks in a spare area, is used for defects (secondary defects) generated during use of the disc.

That is, slipping replacement is used to minimize a reduction in the recording or reproduction speed due to defects, in which a logical sector number to be provided to a sector which is determined to be defective during a certification process for inspecting defects of a disc when the disc is initialized, is provided to a sector next to the defective sector, that is, data is recorded or reproduced by slipping a sector where a defect is generated during recording or reproduction. Here, an actual physical sector number is shifted by the sector number designated by skipping the defective sector. Such a shifting-backwards phenomenon is solved by using as many sectors as there are defects in a spare area located at the end portion of a corresponding recording area (group or zone). According to the specifications, the position of a defective sector replaced by slipping replacement is prescribed to be recorded in a primary defect list (PDL) in a defect management area (DMA) on a disc.

Slipping replacement cannot be used for a defect which is generated while a disc is being used. When a defective portion is disregarded or skipped, discontinuity is introduced into the logical sector numbering, which means that slipping replacement violates file system rules. Thus, linear replacement is used for defects generated during use of the disc, in which an ECC block including a defective sector is replaced by an ECC block existing in a spare area. The location of the defective block replaced by linear replacement is prescribed to be recorded in a secondary defect list (SDL) in a defect management area on a disc. When linear replacement is used, logical sector numbering is not interrupted. However, when there is a defect, the positions of sectors on a disc are discontinuous, and real data for a defective ECC block exists in a spare area.

Figure 1A:
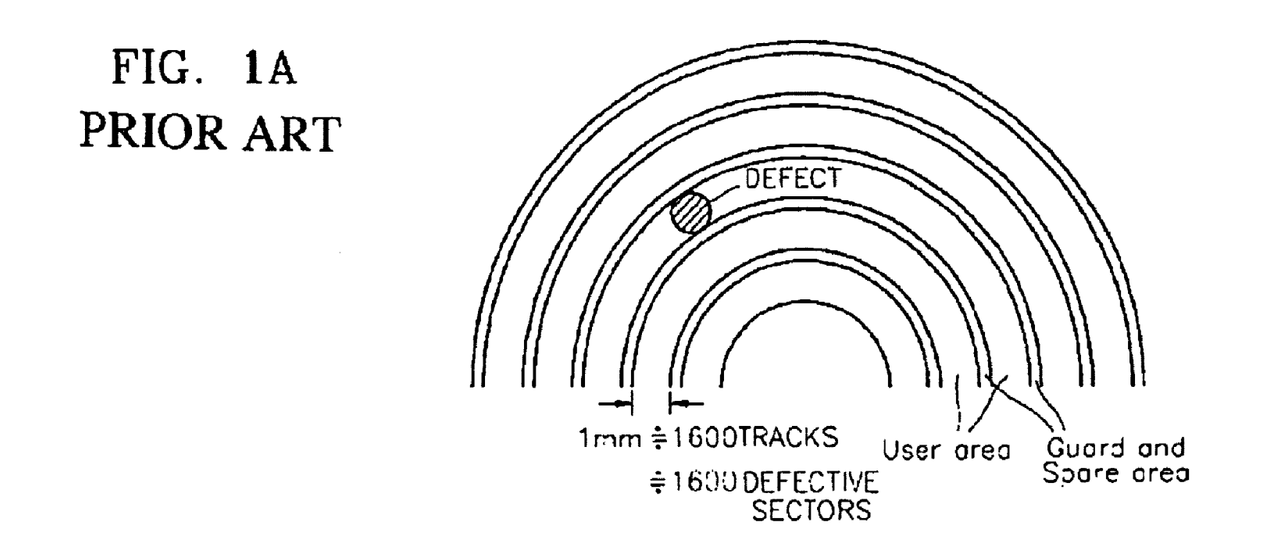
FIG. 1A is a half plan view of a conventional disc having a user area, a guard area and a spare area.

Meanwhile, a digital versatile disc random access memory (DVD-RAM) according to the DVD-RAM standard version 1.0 is comprised of a plurality of groups each having a user area and a spare area which are constant in each zone. FIG. 1A is a half plan view of a disc showing a user area a guard area and spare area, and FIG. 1B one-dimensionally shows several zones on a disc. Each zone is comprised of a guard area, a user area, a spare area, and a guard area which are sequentially arranged.

A disc is segmented into zones to solve inaccurate recording due to a change in the speed of a spindle during recording and to use a zone constant linear velocity (ZCLV) method in order to increase the search speed with respect to a constant linear velocity method.

Figure 1B:
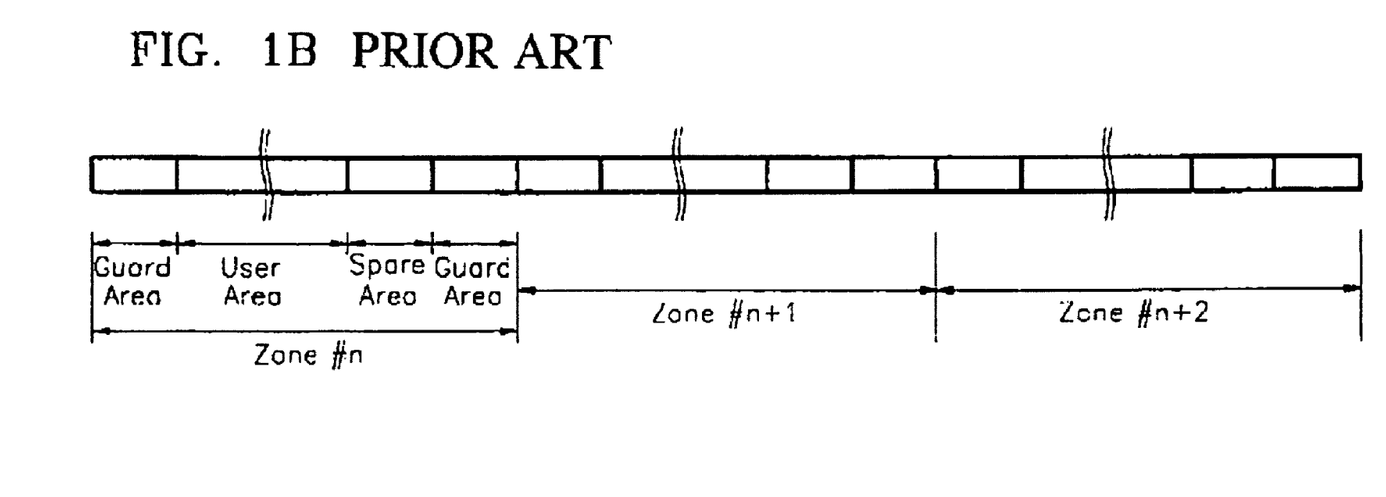
FIG. 1B shows the one-dimensional structure of several zones of a conventional DVD-RAM disc.

That is, when defects are managed by the linear replacement, if possible, linear replacement within a defective zone increases the search speed since there is no change in the linear velocity of a disc. Thus, the DVD-RAM allocates a certain amount of spare area to each zone as shown in FIG. 1B, to accomplish linear replacement.

In this existing defect management method, each zone acts as a group, and a spare area is allocated at the end of each group. Each group is managed as a defect management area. Also, since the start sector number of each group is predetermined, an ECC block is supposed to start at the start position of a zone which is a unit for physically segmenting an area.

The start logical sector number of each group is designated as described above. Thus, when defects are managed by slipping replacement, slipping replacement must be performed only within a corresponding group. In order to replace defects generated in a corresponding group using the slipping replacement, the number of defective sectors that are slipped must be less than the number of usable sectors in a spare area in the corresponding group. Accordingly, a restriction that a large defect generated in one group must be processed within the group limits the maximum size of a defect that can be replaced by the slipping replacement.

If the size of defects to be replaced by slipping replacement is greater than the size of a spare area in a corresponding group, a spare area in another group must be used by linear replacement. However, when linear replacement is used, defects are managed not in units of sectors but in units of ECC blocks, that is, in units of 16 sectors. Thus, a spare area of 16 sectors is required to process one defective sector, which degrades the efficiency of defect management.

Also, a standard size of a spare area for defect management is predetermined, so that spare areas of the same size must be also allocated in applications to which defect management using linear replacement cannot be applied, such as real time recording. Therefore, the efficiency of area utilization of a disc is degraded.

SUMMARY OF THE INVENTION

To solve the above problems, it is an object of the present invention to provide a recording medium which generates a plurality of zones as one group and has a spare area allocated in advance for slipping replacement for a group and a spare area allocated later for linear replacement.

It is another object of the present invention to provide a method of efficiently and flexibly allocating spare areas by generating a plurality of zones as one group, allocating a spare area for slipping replacement in advance, and allocating a spare area later for linear replacement.

It is another object of the present invention to provide an apparatus to efficiently and flexibly allocate and assign spare areas by generating a plurality of zones as one group, assign a spare area for slipping replacement in advance, and assign a spare area later for linear replacement.

It is another object of the present invention to provide an apparatus to efficiently and flexibly allocate and assign spare areas by generating a plurality of zones as one group, assign a spare area for slipping replacement in advance, assign a spare area to prevent fragmentation of blocks at zone boundaries, and assign a spare area later for linear replacement.

Accordingly, to achieve the first and other objects, the present invention provides a recording medium which forms a group out of a plurality of zones on a disc, the group including a user data area and has a primary spare area allocated to the generated group.

To achieve the second and other objects, the present invention provides a method of allocating a spare area for a disc recording and/or reproducing apparatus which allocates the spare area for disc defect management, the method comprising the step of forming a group out of a plurality of zones on a disc, the group including a user data area, and allocating a primary spare area for slipping replacement to the generated group.

To achieve the third and other objects, the present invention provides an apparatus assigning a spare area for a recording medium, the apparatus assigning the spare area for disc defect management by forming a group out of a plurality of zones on a disc, the group including a user data area, and by assigning a primary spare area for slipping replacement to the generated group.

To achieve the fourth and other objects, the present invention provides an apparatus assigning a spare area for a recording medium, the apparatus assigning the spare area for disc defect management by forming a group out of a plurality of zones on a disc, the group including a user data area, and by assigning a primary spare area for slipping replacement to the generated group, assigning an additional spare area to skip blocks at boundary zones, and assigning a secondary spare area for linear replacement to the generated group.

BRIEF DESCRIPTION OF THE DRAWINGS

The above and other objects and advantages of the present invention will become more apparent by describing in detail a preferred embodiment thereof with reference to the attached drawings, in which.

DESCRIPTION OF THE PREFERRED EMBODIMENT

Spare areas on a disc for defect management according to the present invention include a primary spare area, a secondary spare area and a supplementary spare area.

The primary spare area is first allocated for defect replacement when a disc is initialized, and is first used for slipping replacement. A portion of the primary spare area remaining after slipping replacement can be used as a secondary spare area for linear replacement. The secondary spare area, for linearly replacing defects generated during use of the disc, denotes the area remaining after the primary spare area is used for slipping replacement during initialization. The secondary spare area can also denote a separately-allocated spare area. The supplementary spare area, for linearly replacing defects generated while the disc is being used, denotes another spare area additionally allocated.

Figure 2A:
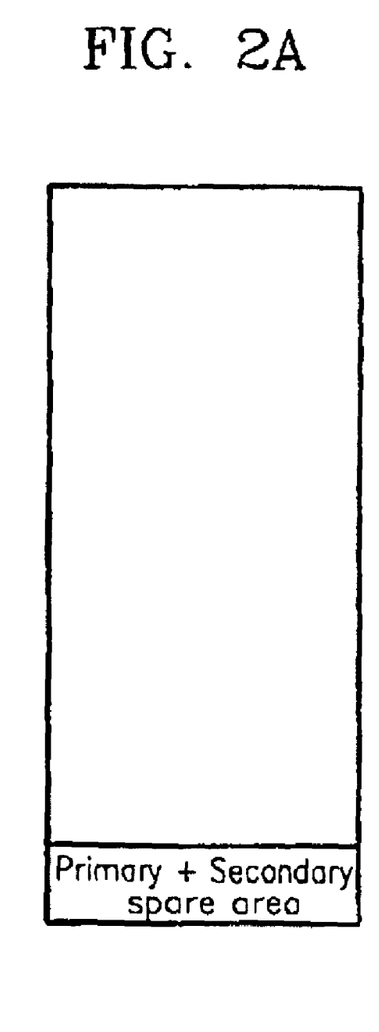
FIGS. 2A and 2B are views for explaining allocation of spare areas upon initialization according to an embodiment of the present invention.
Figure 2B:
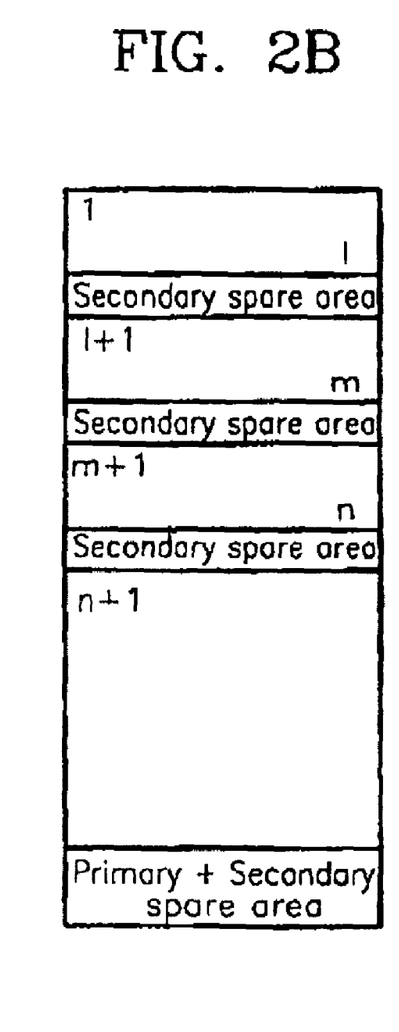
Figure 2C:
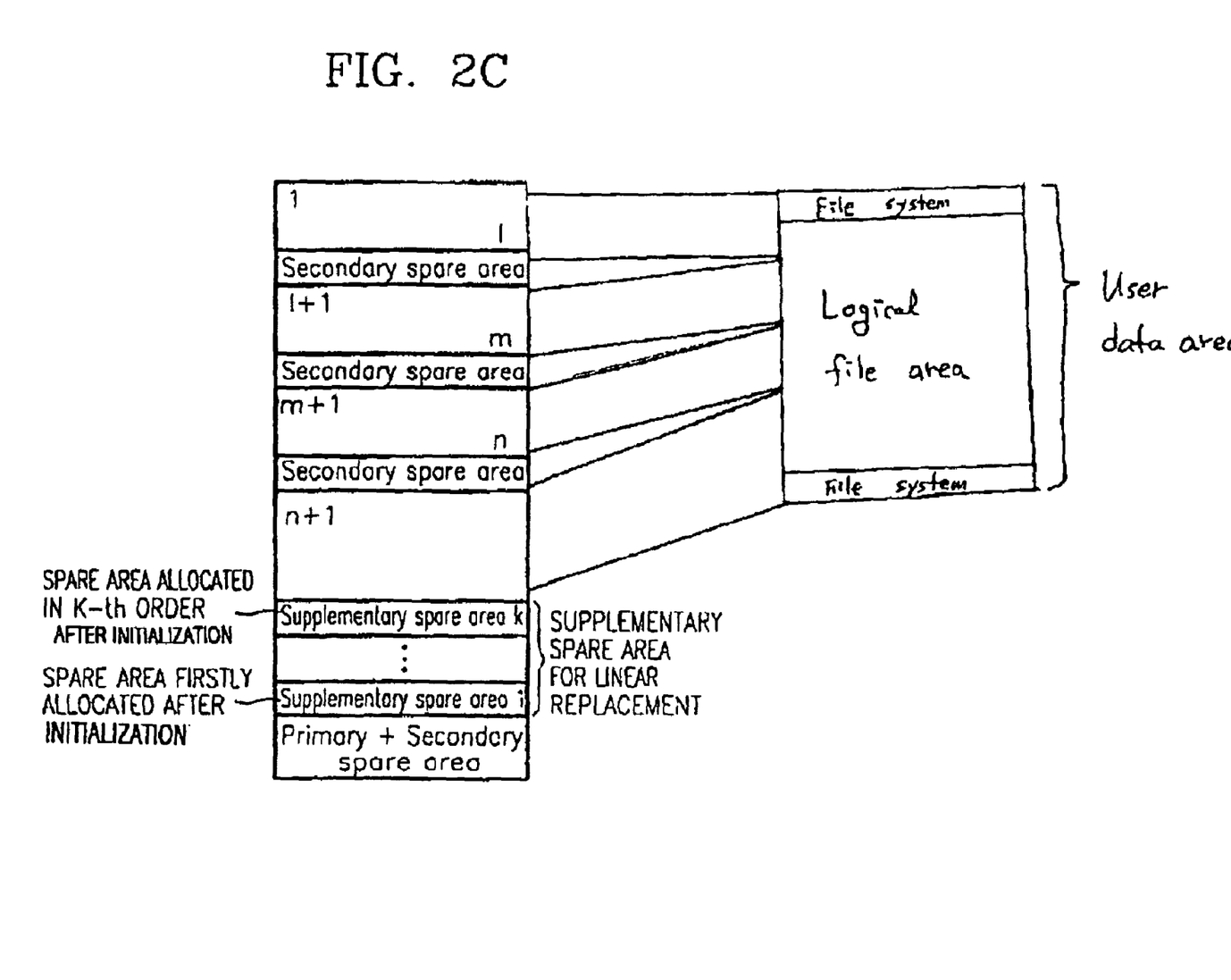
FIG. 2C is a view for explaining allocation of spare areas during use after initialization.

That is, in the present invention as shown in FIG. 2A, a plurality of zones on a disc forms a group, and a spare area (primary spare area) for slipping replacement is first allocated at the end of each group during initialization. Each group includes a user data area. The user data area corresponds to a remaining area of the group, exclusive of a primary spare area, a secondary spare area and a supplementary spare area, as shown in FIG. 2C. The slipping replacement performs replacement in units of sectors, thus increasing the efficiency of utilization of the spare area. However, in the slipping replacement, defective areas are merely not used, and data starts being recorded in the next normal sector, so that the defective areas cannot be used after initialization.

During initialization, as much spare area as possible is allocated as the primary spare area for slipping replacement, but the primary spare area remaining after slipping replacement can be used as a secondary spare area for linear replacement. When it is determined that linear replacement cannot be sufficiently performed by using only the secondary spare area allocated within the primary spare area after slipping replacement is completed upon initialization of a disc, a secondary spare area for linear replacement can be allocated to each zone as well as a portion of the primary spare area, as shown in FIG. 2B. The secondary spare area has no logical sector number, and information on the secondary spare area allocation is stored in and managed by a defect management area (DMA). The secondary spare area allocated during initialization is essentially disposed at the end of a zone, though the secondary spare area is not necessarily allocated in every zone. Since the spare area for linear replacement is allocated at the end of a zone, it is easily controlled. Also, since the spare area is controlled in units of a zone, a spare area in a zone closest to where a defect is generated can be easily found. Furthermore, modification of existing DMA information can be minimized.

The secondary spare area can be disposed before a guard area which is the last part of a zone. When the secondary spare area is disposed in each zone, its size can be predetermined as a relative size or an absolute size according to a numerical expression (for example, 3% of each zone).

While a disc is being used after being initialized, when a spare area for linear replacement allocated in units of zones is insufficient, a predetermined amount of supplementary spare area for linear replacement is allocated starting from the highest portion of a logical file area in a file system, as shown in FIG. 2C. The user data area, which is exclusive of the primary spare area, the secondary spare area and the supplementary spare area in the physical area of FIG. 2C, denotes a file system having file list information and a logical file area. During linear replacement, the supplementary spare area is used in reverse order starting from the rearmost of the logical file area, thus solving discontinuity of the logical file area.

Linear replacement is performed in units of ECC blocks, so that an entire spare area of an ECC block is used even when one sector is defective. In the linear replacement, a defective block is replaced by a physically-isolated spare area, so that the search speed is lowered when a defective zone is searched for. However, the linear replacement can respond to defects generated while a disc is being used, so that it is used with respect to secondary defects generated during use of the disc.

Just as much supplementary spare area as the size of an empty continuous area at the rear of the logical file area is allocated. The maximum size of the supplementary spare area must be smaller than the area of a final zone. Here, the logical file area denotes a logical area among the total area used in a file system, where a user data file can be recorded/reproduced.

In a disc having a diameter of 80 mm, the radius of a user data area must be 38 mm at the most since the 80 mm-diameter disc is affected by rapid double refraction from around a 38 mm radius due to injection of a disc.

When a spare area for slipping replacement is allocated at the end of a disc by forming a group out of a plurality of zones according to the present invention, a spare area having a size large enough to be processed in a group is allocated for, at most, 7679 items (for fifteen sectors), which are the maximum number of defects that are processed using a primary defect list (PDL). In this case, a spare area (a spare area used for controlling block positions) must be further allocated to prevent an ECC block from not starting at the start position of a zone due to the shifted-backwards phenomenon of the logical sector number at the boundary between zones caused by slipping replacement.

For example, when a disc applied to the present invention is a 1.46 GB (Giga Bytes) DVD-RAM, a primary spare area allows PDL entries for eight sectors and 64 SDL entries to be processed, thus preventing the generation of a warning immediately after formatting due to a lack of primary spare area. Here, the warning level is generated when a spare area is smaller than 32 ECC blocks.

A PDL entry that can be processed by the primary spare area corresponds to between one sector and eight sectors, and an SDL entry is for between one sector and eight sectors. A spare area for processing the PDL entry ($S_{PDL}$) and a spare area for processing the SDL entry ($S_{SDL}$) can be expressed by the following Inequality 1:

$$1 \leq S_{PDL} \leq 8; \text{ and } 1 \leq S_{SDL} \leq 8 \qquad (1)$$

The shifted-backwards phenomenon of the logical sector number due to slipping replacement, which can occur at the boundary between zones, will now be described with reference to FIGS. 3A and 3B.

Figure 3A:
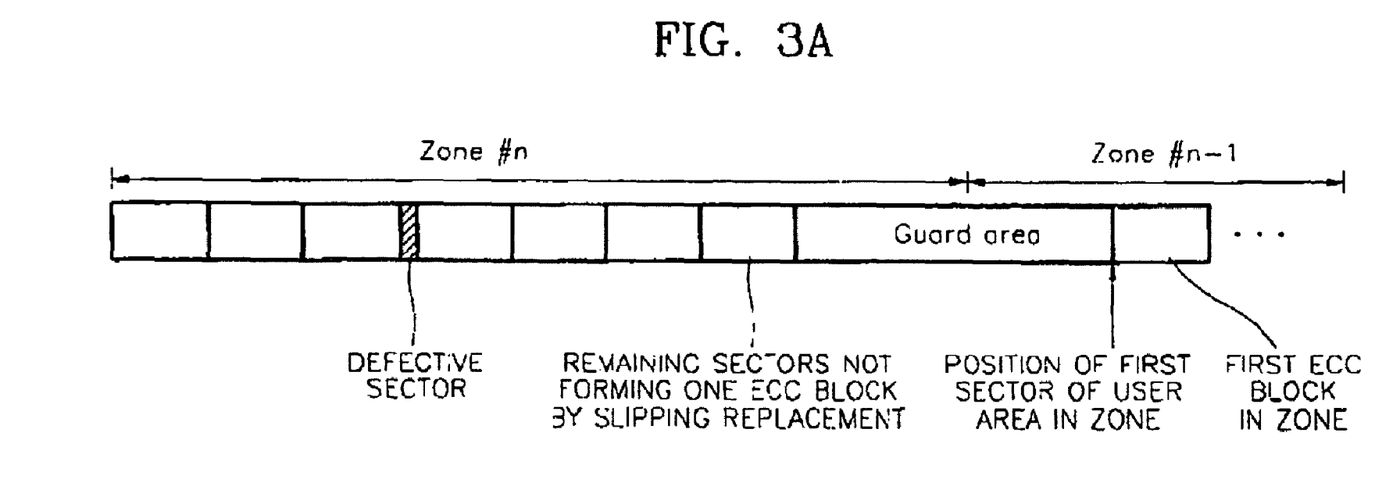
FIGS. 3A and 3B are views illustrating the discontinuity of an ECC block within zones by a defective sector upon slipping replacement.
Figure 3B:
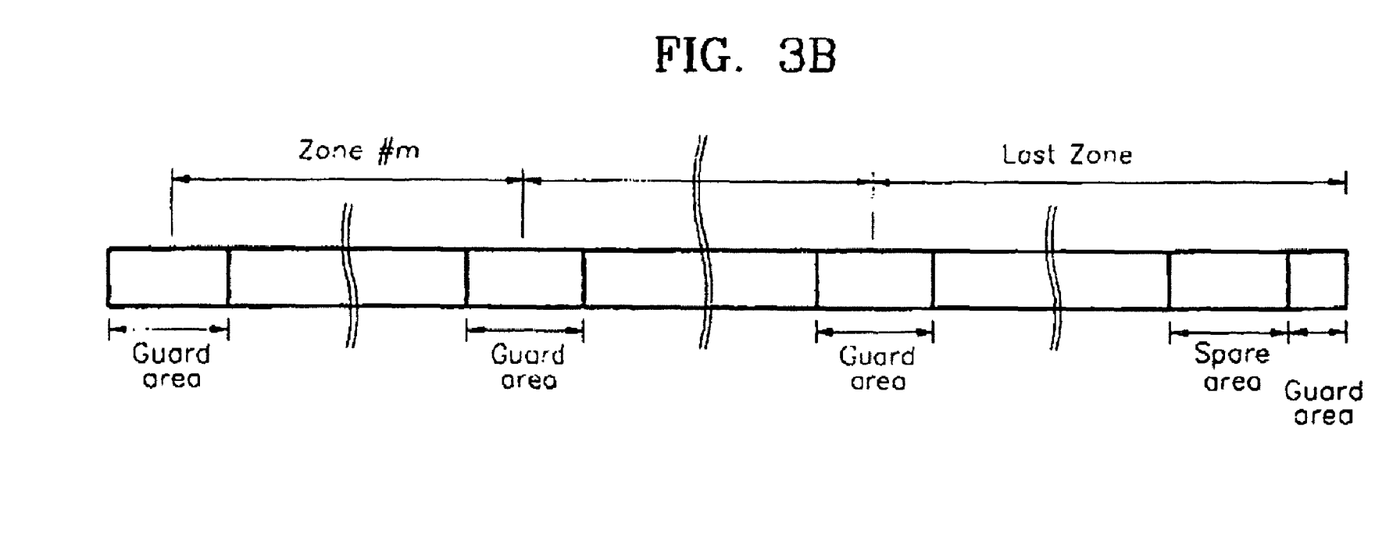

In a group formed of a plurality of zones as proposed by the present invention, when a defective sector exists in a zone #n as shown in FIG. 3A, remaining sectors not forming an ECC block unit are located at the end of the zone due to slipping replacement. When data is written to the remaining sectors not forming an ECC block unit, the shifted-backwards phenomenon of the logical sector number due to slipping replacement occurs at the boundary between zones, so that discontinuity of an ECC block can be generated at the boundary between zones as shown in FIG. 3B. That is, one ECC block can be located over two zones. In this case, problems can occur, in that a disc must be driven at different speeds to read or write one ECC block located over two zones, and a user area and a guard area must be separately processed since a physical sector number is continuous between them. The guard area is a buffering area for preventing driving from becoming unstable due to the difference in the rotating speed between zones.

In the present invention, when less sectors than the number of sectors (16 sectors) for forming one ECC block remain at the end of a zone due to generation of defective sectors, they are not used and skipped. A size as large as expressed by the following Equation 2 must be allocated to a spare area used for controlling an ECC block to start at the start position of a zone in response to the shifted-backwards phenomenon of a logical sector number that may occur at the boundary between zones due to slipping replacement:

$$\text{spare area for block position control} = (\text{number of zones} - 1) \times (\text{number of sectors for each error correction block} - 1) \qquad (2)$$

In a DVD-RAM disc, an ECC block has 16 sectors, so that a maximum of 15 sectors can remain at the end of a zone if an ECC block does not start at the beginning of a zone. Remaining sectors at the end of each zone which do not form an ECC block, must also be skipped in order to match the start position of an ECC block with the start position of a zone, so that a spare area as large as the skipped sectors is further required. The number of boundaries between zones is obtained by subtracting one from the number of zones. That is, where there are two zones, the number of connection portions between zones is one, and where there are three zones, the number of connection portions between zones is two. A spare area for block position control which is as large as one ECC block, can be substantially allocated to each zone.

Thus, it is preferable that one disc has only one group for slipping replacement. In this case, a spare area for slipping replacement can be allocated at the end of the disc in consideration of the number of entries that can be processed using PDL and SDL, and the size of a spare area (here, a maximum of 32 ECC blocks) for controlling the start position of an ECC block on the boundary between zones.

In this way, a plurality of zones are set as one group, and a spare area for slipping replacement is allocated at the end of the group. Thus, degradation of the capability to cope with a burst error generated by a large scratch is suppressed due to the small size of a spare area allocated in each group when there are a plurality of groups each having a plurality of zones.

For example, in a disc of about 4.7 GB capacity having one group in each zone, one group includes about 1600 tracks, and the width of each track on a physical disc is about 1 mm, as shown in FIG. 1A. When a scratch larger than 1 mm is generated on the disc in the radial direction, about 1600 sectors become defective. However, if a group is formed of one zone and a spare area is allocated at a certain ratio according to the capacity of the disc, it is determined that only about 1100 sectors can be slipping-replaced at the inner circumferential portion of the disc. Hence, about 400 to 500 remaining sectors cannot be replaced by slipping replacement, and are replaced by linear replacement instead. In this case, about 400 to 500 ECC blocks for spare areas are required, and the performance of the disc at a zone where the corresponding defect is generated is greatly degraded. However, when a large spare area is allocated with respect to the entire disc for slipping replacement as proposed by the present invention, slipping replacement can even be performed with respect to such a large defect.

Figure 4:
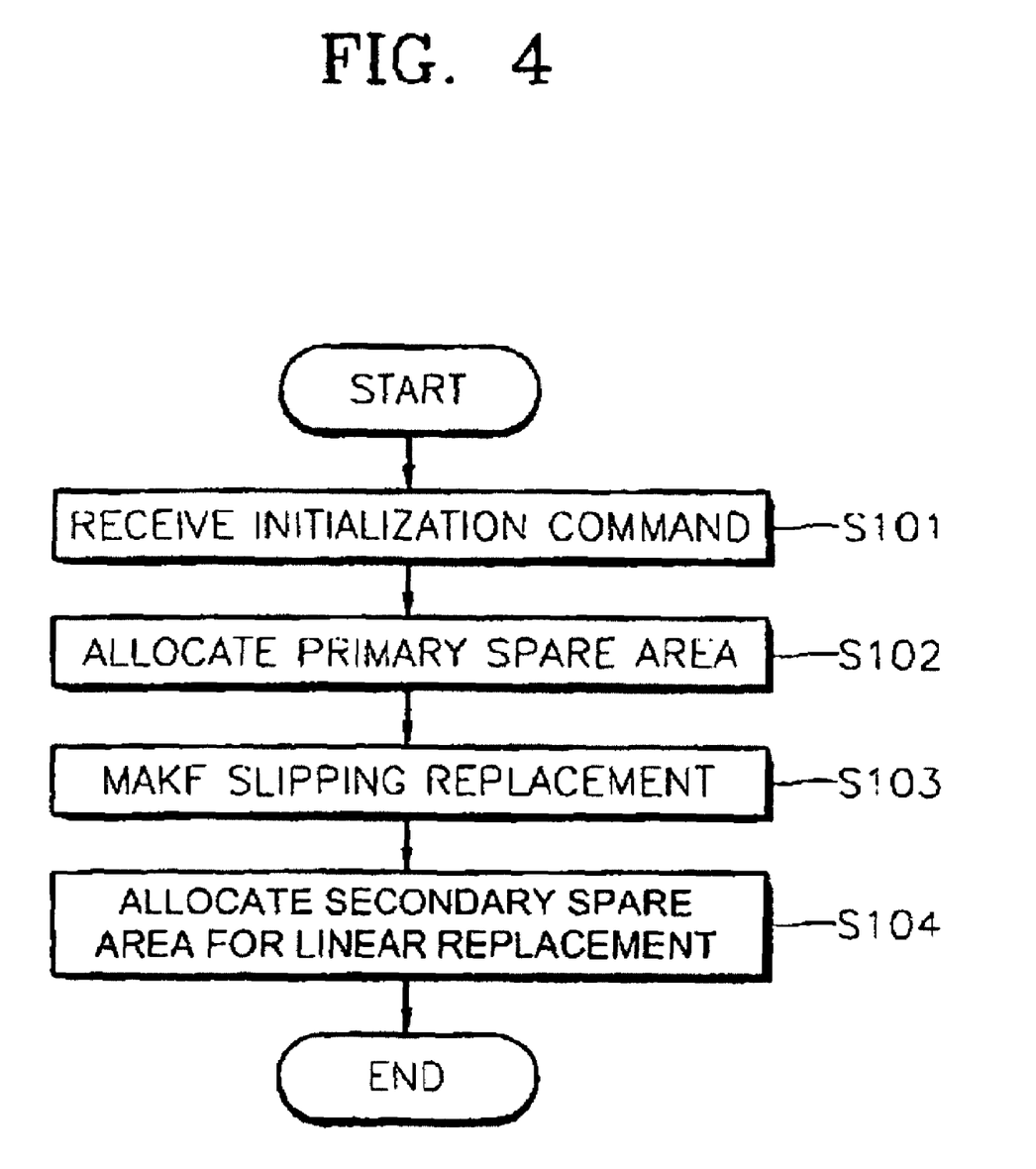
FIG. 4 is a flow chart illustrating a method of allocating spare areas during initialization according to the embodiment of the present invention.

FIG. 4 is a flow chart illustrating a method of allocating spare areas to a disc during initialization according to an embodiment of the present invention. Referring to FIG. 4, when an initialization command is received in step S101, one group is formed of a plurality of zones of a disc in response to the initialization command, and a primary spare area is allocated at the end of the group, in step S102. That is, the primary spare area for slipping replacement includes a spare area for defect management with respect to 7679 data sectors (480 ECC blocks), where 7679 is the maximum number of defect management entries that can be processed using PDL, and a spare area (here, a maximum of 32 ECC blocks) for synchronizing the start position of an ECC block with the start position of each zone. Slipping replacement causes misalignment of the start sector of an ECC block at the start position of each zone, as shown in FIG. 3A. This misalignment causes fragmentation in the ECC block which is located at the zone boundary. It is preferable not to use such a fragmented ECC block. To avoid using a fragmented ECC block, an additional spare area is necessary to skip the fragmented ECC block.

Meanwhile, in a 1.46 GB DVD-RAM disc, the primary spare area can process PDL entries for 8 sectors and 64 SDL entries, and is allocated in further consideration of the spare area for block position control.

When the primary spare area is allocated, a determination is made with respect to the entire disc area as to whether a defect is generated, and a generated defect is replaced by slipping replacement using the primary spare area allocated at the end of the group, in step S103. Here, if the primary spare area allocated while the defect is being replaced by slipping replacement is insufficient, the corresponding disc is determined to be defective, and a step for generating an initialization error message can be further included to prevent the disc from being used.

When slipping replacement is completed in step S103, the portion of the primary spare area not used during slipping replacement is allocated to a secondary spare area for linear replacement in step S104. Secondary spare areas for linear replacement can be allocated to each respective zone as well as a portion of the primary spare area. Information associated with allocation of the secondary spare areas for linear replacement allocated to each zone, respectively, is stored in a defect management area (DMA) on the disc. When allocation of the primary spare area, and allocation of the secondary spare areas for linear replacement are completed, initialization is completed. It is preferable that the secondary spare area within the primary spare area used for linear replacement, and the secondary spare area allocated to each zone are used in reverse order from the rearmost of the respective secondary spare areas to unify a method of managing a supplementary spare area for linear replacement.

Figure 5:
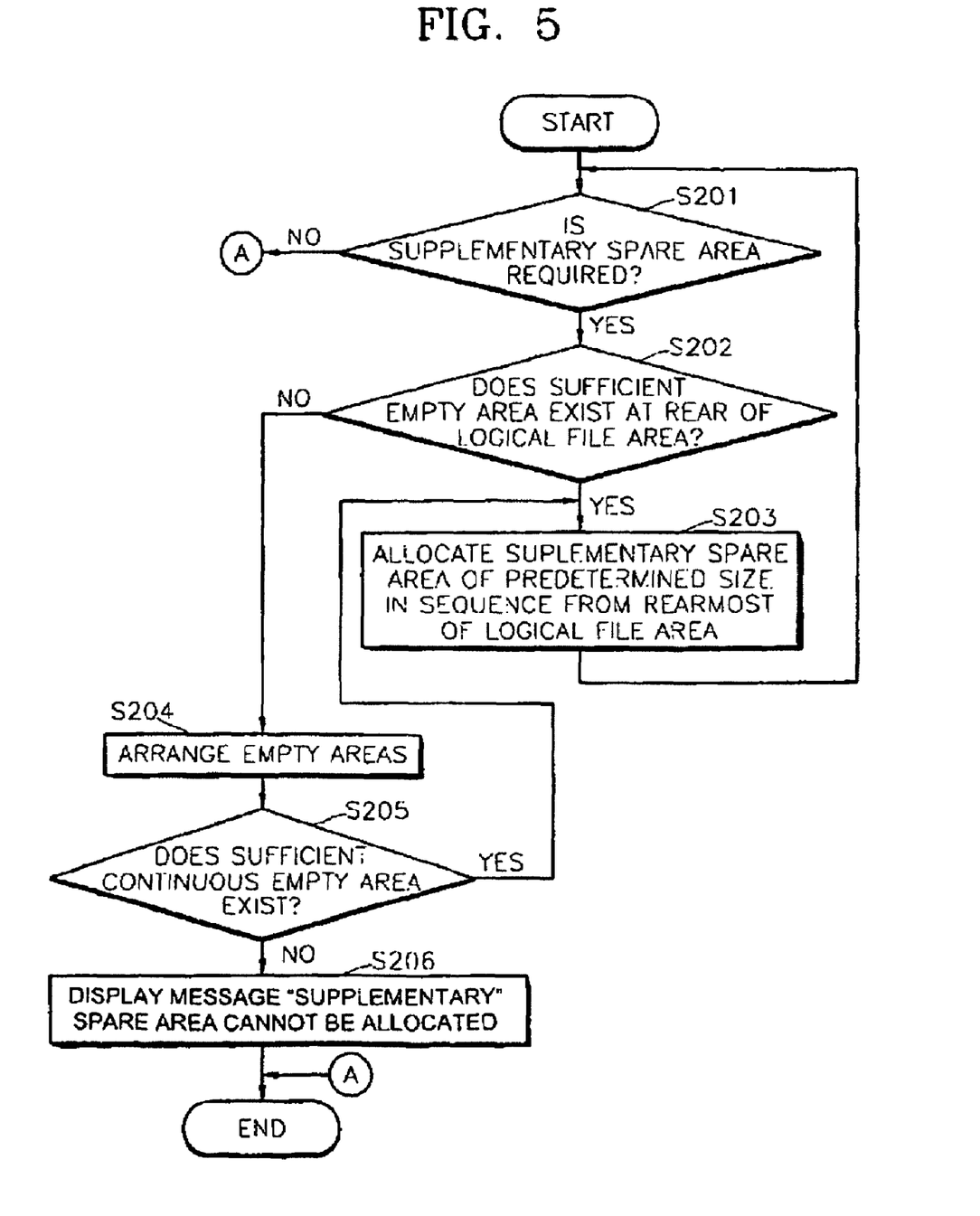
FIG. 5 is a flow chart illustrating a method of allocating spare areas during use after initialization according to the embodiment of the present invention.

FIG. 5 is a flow chart illustrating a method of allocating spare areas while a disc is being used after it has been initialized, according to an embodiment of the present invention. When the size of the secondary spare area for linear replacement allocated during initialization of a disc is insufficient to replace defects generated during use of the initialized disc, a supplementary spare area for linear replacement is allocated.

In FIG. 5, a determination is made as to whether a supplementary spare area for linear replacement is required during use of the disc, in step S201. If it is determined that the supplementary spare area is required, a determination is made as to whether a sufficient amount of continuous empty area exists at the rear portion of a logical file area, in step S202. If it is determined in step S202 that a sufficient amount of continuous empty area exists at the rear portion of the logical file area, a supplementary spare area of a predetermined size is allocated for linear replacement starting from the rearmost portion of the logical file area, in step S203, and the step S201 is again performed.

Allocation of the supplementary spare area corresponds to redistribution of a logical file area generated after initialization, so the help of a file system is required. In this case, the supplementary spare area for linear replacement is not allocated to each zone but can be allocated in the direction from the rearmost of a logical file area, that is, from an area having the highest logical sector number in a logical file area where files can be recorded for user data, to an area having a lower logical sector number. When a secondary defect is generated and is replaced by the thus-allocated supplementary spare area by linear replacement, the search speed is barely degraded, but generation of a logical sector number area in the logical file area, that the file system cannot use, can be prevented. That is, discontinuity of the logical sector number can be prevented.

In a defect management method for existing linear replacement, a defective ECC block must be replaced by the first normal ECC block that is not used among ECC blocks within a spare area, so that defective blocks within the spare area are not managed even while the spare area is used in sequence from the head and the defective spare area is skipped. In this case, the spare area is allocated to each zone for slipping replacement and linear replacement. At this time, a group is formed of one zone, and thus, a plurality of groups are formed in a plurality of zones. However, in the case that blocks in the supplementary spare area are sequentially used from the head as in the existing method, a problem occurs when the supplementary spare area is further increased. That is, whenever the size of the supplementary spare area increases, information on the increased supplementary spare area must be separately managed. To solve this problem, blocks in the supplementary spare area are used in reverse order from the rear. Hence, if only the highest sector number from which the supplementary spare area starts, and the lowest sector number is detected, the entire supplementary spare area can be continuously managed. That is, a recording and/or reproducing apparatus does not need to know how often a supplementary spare area of a predetermined size is allocated, and can manage the supplementary spare area only if the start and end positions thereof are recognized. However, the maximum size of the supplementary spare area must be smaller than a final zone.

If it is determined in step S202 that no sufficient continuous empty area exists at the rear of the file system, the empty areas are arranged by the file system or an application program, in step S204. Thereafter, a determination is again made as to whether a sufficient amount of continuous empty area exists, in step S205. A supplementary spare area can only be allocated in a physically contiguous area. If there is not a big enough physically contiguous area, then it is necessary to de-fragment the unused area. Thus, the empty area may be physically moved by the file system or application program. If there is a sufficient amount of continuous empty area, step S203 of allocating the supplementary spare area is performed. If the amount of continuous empty area is insufficient even after the arrangement of the empty areas, a message "supplementary spare area cannot be allocated" is displayed, in step S206. Then, the process is terminated. If it is determined in step S201 that a supplementary spare area is not required, the process is also terminated.

Meanwhile, a small spare area for defect management can be allocated in special applications such as real time recording or the like, linear replacement with respect to secondary defects is restrictedly made, and most defects can be processed by the file system or application program. Also, it is preferable that secondary defects are processed by the file system or application program upon real time recording in order to obtain a minimum of transmission speed required by a corresponding application.

In this case, the recording and/or reproducing apparatus is also required to detect defects and make minimum management with respect to the detected defects. Here, the minimum management means management using SDL as to whether a generated defect has been linearly replaced.

For example, for defects generated during use of a disc that has defect management information in which defect management using linear replacement is not used for real time recording, only the start sector number of each defective block is recorded in a secondary defect list (SDL), information representing that the defective block has not been replaced is recorded in a forced reallocating masking (FRM) bit in an SDL entry representing whether the defective block has been replaced, and information representing that the defective block has not been replaced is recorded in the start sector number of a replaced block in the SDL entry.

Figure 6:
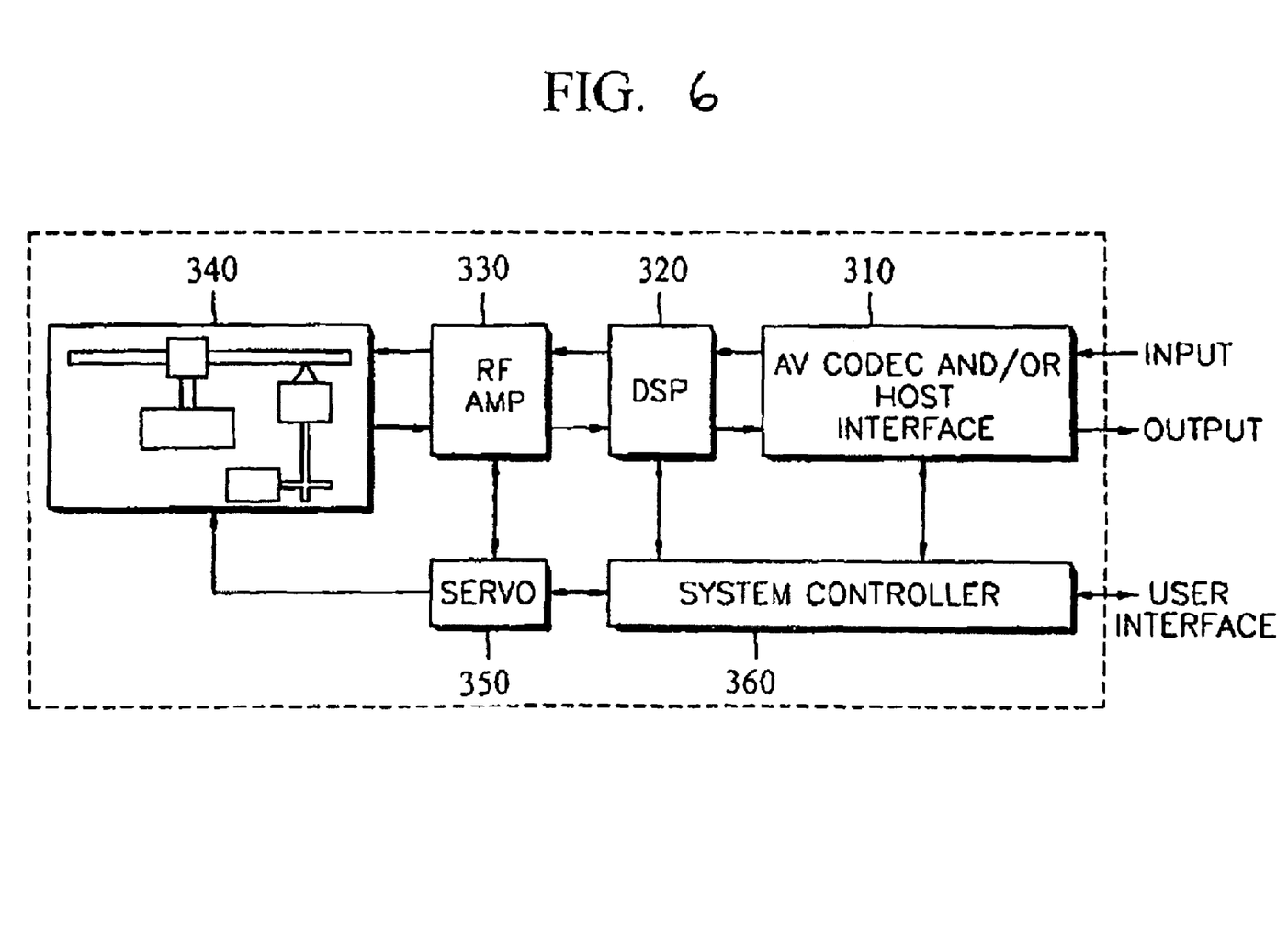
FIG. 6 is a block diagram of a recording/reproducing apparatus for implementing the present invention.

Further, FIG. 6 is a block diagram of a recording/reproducing apparatus for implementing the present invention. The function of the recording/reproducing apparatus for recording/reproducing A/V (audio/video) data using the recordable and rewriteable recording media such as the DVD-RAM is largely divided into recording, reproduction, and allocating and assigning spare areas.

During recording, an AV codec and/or a host interface 310 compression-codes an externally applied AV signal according to a predetermined compression scheme and supplies size information for the compressed data. A digital signal processor (DSP) 320 receives the compressed A/V data supplied from the AV codec and/or the host interface 310, adds additional data for error correction code (ECC) processing thereto, and performs modulation using a predetermined modulation scheme. A radio frequency amplifier (RF AMP) 330 converts the modulated data from the DSP into a radio frequency (RF) signal. Then, a pickup 340 records the RF signal supplied from the RF AMP 330 on a disk mounted on a turn table of the pickup 340. A servo unit 350 receives information necessary for servo control from a system controller 360 and stably performs a servo function for the mounted disk.

During playback of information data stored on the disk, the pickup 340 picks up the optical signal from the disk having the information data stored therein, and the information data is extracted from the optical signal. The RF AMP 330 converts the optical signal into an RF signal, and extracts the servo signal for performing a servo function, and modulated data. The DSP 320 demodulates the modulated data supplied from the RF AMP 330 corresponding to the modulation scheme used during modulation, performs an ECC process to correct errors, and eliminates added data. The servo unit 350 receives information necessary for servo control from the RF AMP 330 and the system controller 360, and stably performs the servo function. The AV codec and/or the host interface 310 decodes the compressed A/V data supplied from the DSP 320 to output an A/V signal. The system controller 360 controls the overall system for reproducing and recording the information data from and on the disk mounted on the turn table of the pickup 340.

In allocating and assigning spare areas, the system controller 360 recognizes one of the defective areas and registers the defect in the defect management area (DMA) of the disk and allocates and assigns spare areas to the disk, including primary, secondary, and supplemental spare areas. In addition, the system controller 360 also prevents fragmentation of ECC blocks. The generation of fragmented ECC blocks is prevented by allocating and assigning additional spare areas to skip the fragmented ECC block to the beginning of an adjoining zone.

The system controller 360 and the DSP 320 handle processing the data during recording and reproduction, including recording and reproducing based on a slipping and linear replacement performed on the disk.

In summary, when a disc is initialized, if there are more defective sectors than the maximum number of entries in the PDL, the remaining defective sectors will be replaced by linear replacement. If the number of remaining defective sectors is larger than can be handled by the usable ECC blocks (the secondary spare area), then the supplementary spare area shall be allocated. The primary spare area can handle the maximum number of PDL entries and the given number of SDL entries. Here, the primary spare area is used for slipping replacement and linear replacement, the secondary spare area is a portion of the primary spare area which is used for defects in the SDL by linear replacement, and the supplementary spare area is only used for linear replacement which cannot be covered by the primary spare area. Additional secondary spare areas cannot be allocated. However, the secondary spare area can exist in a portion of the primary spare area as shown in FIG. 2A, or it can exist in each zone as shown in FIG. 2B. The remaining area of the primary spare area after slipping replacement will automatically be used as a secondary spare area.

Since the recording and/or reproducing apparatus cannot recognize defect contents processed by the file system or an application program when a corresponding disc is again initialized and used for another purpose, it can reinitialize the disc in disregard of generated defects. Accordingly, fast formatting cannot be performed, where the secondary defects (stored in the SDL entry) are simply changed into a PDL entry and processed by slipping replacement, so that the recording and/or reproducing apparatus must manage defects even when the secondary defects are managed by the file system or application program. Therefore, the generation or non-generation of defects must be controlled in all cases using the SDL regardless of performance or non-performance of linear replacement and the existence or non-existence of a spare area for linear replacement.

As described above, the present invention removes a restriction on the maximum size of a defect that can be replaced by slipping replacement, without violating a restriction that even a large defect generated in a group must be processed within the group, so that more efficient slipping replacement can be made. Also, the size of a spare area can be appropriately adjusted according to an application purpose, so that the disc area can be more effectively utilized.

What is claimed is:

1. A reproducing apparatus which reproduces data stored on a disc, comprising:
    a pickup to read the data from the disc; and
    a controller controlling the pickup to read the data from the disc by skipping data from a first zone to a second zone of a medium when the data is fragmented between the first and second zones by a defect management of the first zone, and reproducing the read data.

2. A disc reproducing apparatus which reproduces data stored on a disc according to an assigned a spare area for disk defect management, the apparatus comprising:
    a pickup to read the data from the disc; and
    a controller controlling the pickup to read the data from a user data area and a primary spare area of the disc and which reproduces the data, the disc having been assigned a group having a plurality of zones of the user data area, the group includes the user data area and a data block and is assigned the primary spare area for the group,
    wherein the data block of the group is skipped during recording since the data block would be fragmented by a boundary between the plurality of zones.

3. A method of reproducing data stored on a disc, comprising:
    reading the data from the disc by skipping data from a first zone to a second zone of a medium when the data is fragmented between the first and second zones by a defect management of the first zone; and
    reproducing the read data.

* * * * *